United States Patent [19]

Norman et al.

[11] 4,324,669
[45] Apr. 13, 1982

[54] FOAMED HIGH VISCOSITY AQUEOUS INORGANIC ACID SOLUTIONS AND METHODS OF USING THE SAME

[75] Inventors: Lewis R. Norman; Tommy R. Gardner, both of Duncan, Okla.

[73] Assignee: Halliburton Company, Duncan, Okla.

[21] Appl. No.: 95,860

[22] Filed: Nov. 19, 1979

[51] Int. Cl.$^3$ .............................................. E21B 43/27
[52] U.S. Cl. ................................ 252/8.55 C; 166/282; 166/307
[58] Field of Search .................... 252/8.55 R, 8.55 C, 252/307; 166/282, 307, 308

[56] References Cited

U.S. PATENT DOCUMENTS

| | | | |
|---|---|---|---|
| 2,596,137 | 5/1952 | Fast | 252/8.55 X |
| 2,778,427 | 1/1957 | Cardwell et al. | 166/308 X |
| 3,373,107 | 3/1968 | Rice et al. | 252/8.55 |
| 3,937,283 | 2/1976 | Blauer et al. | 166/280 |
| 3,980,136 | 9/1976 | Plummer et al. | 166/280 |
| 4,044,833 | 8/1977 | Volz | 166/307 |
| 4,061,580 | 12/1977 | Jahnke | 252/8.55 |
| 4,231,882 | 11/1980 | Elphingstone et al. | 252/8.55 |

FOREIGN PATENT DOCUMENTS 2901222  7/1979  Fed. Rep. of Germany ..... 252/8.55 C

OTHER PUBLICATIONS

Schonfeldt, *Surface Active Ethylene Oxide Adducts*, Pub. 1969, pp. 335 and 336.

*Primary Examiner*—Herbert B. Guynn
*Attorney, Agent, or Firm*—Edward F. Sherer; Thomas R. Weaver; John H. Tregoning

[57] ABSTRACT

Foamed high viscosity aqueous inorganic acid solutions and methods of treating subterreanean well formations using such solutions are provided. The foamed acid solutions are comprised of water, at least one water soluble inorganic acid, a gelling-foaming agent comprised of a solution of a water soluble organic solvent and an ethoxylated fatty amine or a mixture of such amines and an inert gas.

12 Claims, No Drawings

FOAMED HIGH VISCOSITY AQUEOUS INORGANIC ACID SOLUTIONS AND METHODS OF USING THE SAME

Acidizing and fracturing procedures using aqueous acid solutions are commonly carried out in subterranean well formations to accomplish a number of purposes, one of which is to facilitate the increase in the recovery of hydrocarbons therefrom. In acidizing procedures, aqueous acid solutions are introduced into well formations under pressure so that the acid solutions flow into the pore spaces of the formations and react with materials contained therein whereby the pore spaces are enlarged and the permeability of the formations increased. In fracture acidizing procedures, one or more fractures are produced in the formations and the acid solutions are introduced into the fractures to etch flow channels therein and/or to enlarge the pore spaces in the fracture faces and in the formations.

Increasing the viscosity of an aqueous acid solution, hereinafter referred to as "gelling," by the inclusion of certain swellable materials or gelling agents therein has been accomplished heretofore. In acidizing and/or fracture acidizing subterranean formations, gelled aqueous acid solutions are useful in preventing the acid from becoming prematurely spent and inactive. In addition, gelling of the acid solutions enables the development of wider fractures so that live acid can be forced further into the formation from the well bore. Furthermore, increasing the viscosities of the acid solutions also permits better fluid loss control.

Gelling agents such as hydratable gums and cellulose derivatives have been utilized to increase the viscosity of aqueous acid solutions. However, the gels produced using such gelling agents generally have limited stability at high temperatures in the presence of acid. Other gelling agents which increase the viscosity of aqueous acid solutions have been developed and used, but they are often difficult to disperse and usually require considerable mixing or agitation to develop full viscosity. Still other prior art gelling agents can form an undesirable precipitate during the dissolution of formation materials such as limestone or dolomite, which precipitate can remain in the formation to thereby damage it by decreasing the permeability thereof.

Recently, foamed acid solutions have been utilized in well stimulation treatments such as fracture acidizing procedures. In such treatments, an aqueous acid solution is foamed prior to introduction into a formation to be treated by combining a foaming agent with the acid solution and injecting an inert gas thereinto. Such foamed acid solutions have been found to have greatly improved fluid loss control, i.e., less fluid leakoff into permeable formations.

By the present invention aqueous acid solutions which are both foamed and gelled and methods of using such solutions are provided. The foamed and gelled aqueous acid solutions of this invention are simple to prepare, and have excellent viscosity, fluid loss and other properties.

The gelling agent used in accordance with the present invention also functions as a foaming agent and is easily dispersed into an aqueous acid solution prior to foaming the solution. A small quantity of the agent rapidly increases the viscosity of the acid solution with a minimum of mixing and agitation. After foaming, the resulting foamed and gelled aqueous acid solution has excellent stability, high viscosity and low fluid loss over a broad temperature range, has reduced pumping friction pressure, is relatively non-damaging to subterranean formations treated therewith, and, upon becoming spent in subterranean formations, and, without the inclusion of chemical breakers or special additives therein, breaks to a low viscosity liquid having excellent fines suspension properties.

The gelling agent which also functions as a foaming agent of this invention is comprised of a solution of a water soluble organic solvent and an ethoxylated fatty amine having the general formula

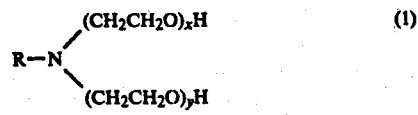

wherein: R is selected from saturated and unsaturated aliphatic groups having in the range of from about 8 to about 22 carbon atoms, and mixtures thereof, and x and y each have a value in the range of from about 0 to about 10. The preferred ethoxylated fatty amines and mixtures thereof useful herein are those wherein the average sum of the values of x and y in the amines used is in the range of from about 1.3 to about 2.2.

Mixtures of ethoxylated tertiary fatty amines derived from fats and oils such as coconut oil, soy bean oil, and tallow are particularly suitable for use in accordance with the present invention.

A preferred mixture of ethoxylated fatty amines for use in this invention is a mixture of amines of the general formula:

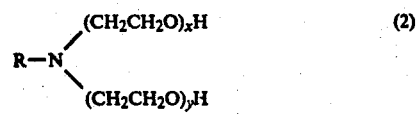

wherein:

R is selected from the group consisting of saturated and unsaturated aliphatic groups having in the range of from about 14 to about 18 carbon atoms and mixtures of such groups; and the average sum of the values of x and y in the mixture of ethoxylated amines is equal to 2.

In the most preferred embodiment, x and y each have a value of 1 (one).

Examples of such amines are those derived from fatty acids of the type hexadecyl, tallow, soya and oleyl, either saturated or unsaturated and either as pure components or mixtures.

A variety of organic solvents can be utilized in making the gelling agents so long as such solvents are capable of dissolving the ethoxylated fatty amines and are also water soluble. Examples of such water soluble organic solvents include alkanols having in the range of about 1 to 5 carbon atoms per molecule, such as methanol, ethoanol, isopropanol and t-butanol; ketones having in the range of about 3 to 6 carbon atoms per molecule, such as acetone and methylethyl ketone; polyhydroxy compounds having in the range of about 2 to 6 carbon atoms per molecule, such as ethylene glycol and glycerine; ethers having in the range of about 2 to 6 carbon atoms per molecule, such as dioxane and tetrahydrofuran; compounds containing both ether and alcohol functions having in the range of about 4 to 3 carbon atoms per molecule, such as diethylene glycol and triethylene glycol; organic acids having in the range of about 1 to 10 carbon atoms per molecule, such as formic acid, malonic acid, acetic acid, gluconic acid, levulinic acid and propionic acid; esters having in the range of about 2 to 6 carbon atoms per molecule, such as methyl formate, dimethyl oxylate and dimethyl malonate; and lactones having in the range of about 3 to 5 carbon atoms per molecule, such as beta-propyl lactone and gamma-butyl lactone. Due to the density low freezing point and/or high flash point (tag closed cup) of the resulting gelling agent the organic acids are preferred with acetic acid being the most preferred.

The water soluble organic solvent useful herein is preferably in liquid phase at the temperature at which it is mixed with the ethoxylated fatty amine. Furthermore, mixtures of the organic solvents can be used. An example is a mixture of methanol and gluconic acid.

The gelling-foaming agent useful herein can be prepared by mixing the water soluble organic solvent with the ethoxylated fatty amine for a period of time sufficient to completely dissolve the amine in the solvent. The quantity of ethoxylated amine dissolved in the solvent can range in an amount of from about 10 to about 80, preferably from about 50 to about 60 percent amine by the weight of solution.

As mentioned above, the organic solvents can be used singly, or in mixtures of solvents of the same chemical class (acids with acids, ketones with ketones and the like) or in mixtures of solvents of different chemical classes (acids with alcohols, ethers with ketones and the like). A preferred organic solvent is a mixture of chemicals of different chemical classes wherein at least one of the classes is an organic acid.

The ethoxylated fatty amines useful herein are very difficult to dissolve directly in aqueous inorganic acid solutions. However, a solution of the amines dissolved in a water soluble organic solvent, such as acetic acid, readily dissolves in an aqueous inorganic acid solution and substantially immediately increases the viscosity of the acid solution.

The gelling-foaming agent of the present invention causes an increase in the viscosity of aqueous inorganic acid solutions having acid concentrations in the range of from about 1 to about 25 percent active acid by weight of the solutions. However, acid solutions having acid concentrations of greater than about 25 percent can be mixed with the gelling agent of this invention and such acid solutions, upon being reacted, will begin to exhibit a noticeable increase in viscosity when the acid concentration, due to the reaction, is diminished to a value of about 25 percent. Such increase in viscosity continues with continued decrease in acid concentration until the acid concentration reaches a value in the range of from about 10 percent to about 15 percent. To this extent then, the gelling-foaming agent brings about a delayed gelling characteristic.

The gelling-foaming agent of this invention will cause the viscosity of aqueous inorganic acid solutions having acid concentrations in the range of from about 1 to about 10 percent, and more particularly, in the range of from about 1 to about 5 percent, to rapidly increase providing that the presence of dissolved salts in the acid solution is very low and preferably absent. In this connection, the presence of dissolved salts in the gelled acids cause the gels to break when the acid concentration is less than about 10 percent and particularly when the acid concentration is less than about 5 percent. This breaking feature, as will be further explained below, can be of particular value when the foamed acid gels of this invention are used to acid treat subterranean formations.

The gelling-foaming agent is particularly useful in increasing the viscosity and foaming aqueous inorganic acid solutions such as hydrochloric acid solutions, sulfuric acid solutions, phosphoric acid solutions, hydrofluoric acid solutions and solutions containing mixtures of such acids.

In preparing a gelled and foamed aqueous acid solution of this invention, the acid or mixture of acids utilized can be, and are preferably, diluted with water to obtain an aqueous inorganic acid solution of desired acid concentration. A gelling-foaming agent, i.e., an ethoxylated fatty amine or mixture of such amines of the type described above dissolved in a water soluble organic solvent, is preferably combined with the aqueous acid solution in an amount in the range of from about 0.1 to about 10, and more preferably in the range of from about 2 to 6 percent gelling agent by weight of the aqueous acid solution. The acid solution and gelling agent are agitated or mixed for a short period of time whereupon the viscosity of the aqueous acid solution is increased. More specifically, some increase in viscosity is obtained when as little as 0.1 percent gelling agent is combined with the aqueous acid solution, and greater amounts of the gelling agent bring about increased viscosity. When the gelling agent is combined with the aqueous acid solution in an amount of about 10 percent by weight of the solution, viscosities of about 150 centipoises can be obtained.

Greater viscosity increase can be obtained through use of gelling agent amounts in excess of 10 percent. Thus, 10 percent is not a limit on the capability of the gelling agent to increase the viscosity of acid, but is viewed as a working guide in view of current process economics and the practical capabilities of currently known liquid handling and pumping equipment. After the viscosity of the aqueous acid solution has been increased by the gelling agent, an inert gas such as carbon dioxide or nitrogen is injected into the gelled acid to produce the gelled and foamed aqueous acid solution of this invention. The injection of the inert gas and foaming of the gelled acid solution can be accomplished in a variety of ways well known to those skilled in the art, all of which bring about a very thorough mixing of the gas with the acid solution. A preferred method is to simply pump the inert gas and gelled acid solutions at high velocities into a T connection whereby high shear and mixing are produced. The quantity of inert gas required depends upon the degree of foaming or quality of foam desired, the pressure at which the gas injected into the gelled acid solution and other factors. Generally, a quantity of inert gas in the range of from about 10 to about 1000 standard cubic feet per gallon of gelled acid solution produces a foam of a quality in the range of from about 50 to 90. Foam quality as used herein is defined as the ratio of gas volume to the total volume of foam times 100:

$$\text{Quality} = \frac{\text{gas volume in foam}}{\text{total foam volume}} \times 100$$

A gelled and foamed aqueous acid solution of this invention is comprised of water, a water soluble inorganic acid or mixture of such acids, a gelling agent comprised of a solution of a water soluble organic solvent and an ethoxylated fatty amine having the general formula:

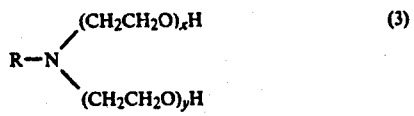

wherein: R is selected from saturated and unsaturated aliphatic groups having in the range of from about 8 to about 22 carbon atoms, and mixtures thereof, and x and y each have a value in the range of from about 0 to about 10, and an inert gas.

A preferred gelled and foamed aqueous acid solution of this invention is comprised of an inorganic aqueous acid solution comprising water and a water soluble inorganic acid or mixture of such acids, a gelling agent comprised of a solution of a water soluble organic solvent and a mixture of ethoxylated fatty amines having the general formula:

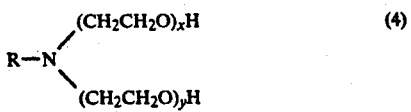

wherein: R is selected from saturated and unsaturated aliphatic groups having in the range of from about 14 to about 18 carbon atoms and mixtures of such groups; and x and y each have a value in the range of from 0 to about 10 with the average sum of the values of x and y in the mixture being in the range of from about 1.8 to about 2.2, and an inert gas.

The most preferred gelled and foamed aqueous acid solution of this invention is comprised of an aqueous acid solution comprising water and an inorganic water soluble acid or a mixture of such acids, a gelling agent present in the aqueous acid solution in an amount in the range of from about 1 to about 10 percent gelling agent by weight of the acid solution, and nitrogen present in the solution in a quantity such that stable foam is produced. The gelling agent is comprised of a solution of a water soluble organic solvent, and a mixture of ethoxylated fatty amines present in the gelling agent in an amount of from about 10 to about 80 percent amines by weight of the gelling agent. The ethoxylated fatty amines have the general formula:

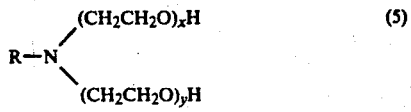

wherein:
R is selected from the group consisting of saturated and unsaturated aliphatic groups having in the range of from about 16 to about 18 carbon atoms and mixtures of such groups; and
the average sum of the values of x and y in said mixture of ethoxylated amines is equal to 2.

In the most preferred embodiment, x and y in formula (5) each have a value of one (1).

The gelled and foamed aqueous acid solutions of this invention are stable over a wide temperature range and therefore will not chemically degrade with time, even at a temperature as high as 250° F.

While the gelled and foamed aqueous acid solutions of this invention have a variety of uses, they are particularly suitable for carrying out acid treatments in subterranean well formations for increasing the production of hydrocarbon fluids therefrom. When the gelled and foamed aqueous acid solutions are introduced into subterranean well formation, the acid spends by reacting with materials in the formation, e.g., limestone and/or dolomite, whereby salts (e.g., chlorides when HCl is used) are formed. The formation of salts in the spent acid solution causes the viscosity of the solution to decrease. That is, as the acid spends and salts form, the viscosity of the spent acid solution begins to decrease when acid concentration is in the range of about 10 to 15 percent. Thus, chemicals known in the art as "breakers" are not required when the gelled and foamed acid solutions of this invention are used to acid treat subterranean well formations. The spent acid solutions, after breaking and separation of the gaseous phases therefrom, have viscosities in the range of from about 5 to about 15 centipoises and have excellent particle suspension properties which facilitates the efficient clean-up of a treated formation.

In using the gelled and foamed aqueous acid solutions for carrying out acidizing treatments in a subterranean well formation, an aqueous acid solution of desired acid strength is first prepared. For example, in carrying out acidizing or acid fracturing treatments in limestone or dolomite formations, aqueous hydrochloric acid solutions in concentrations in the range of from about 3% to about 28% by weight are often utilized. After the particular aqueous acid solution to be used has been prepared and diluted to the desired strength, the gelling agent of the present invention is combined therewith, preferably in an amount in the range of from about 0.1 to about 10 percent by weight of the acid solution whereby the viscosity of the solution is increased. Other conventional well formation treating additives, such as corrosion inhibitors, fluid loss additives, etc., can also be combined with the solution. The resultant gelled aqueous acid solution is foamed with an inert gas, preferably nitrogen, and then introduced into the formation to carry out an acidizing or acid fracturing treatment therein. After the foamed aqueous acid solution has become spent by reaction with materials in the formation and thereby broken to a low viscosity fluid and separated from the inert gas, it is produced from the formation and the formation is cleaned up using conventional clean-up procedures followed by placing the formation on production.

When a gelled and foamed aqueous hydrochloric acid solution of this invention having an initial acid concentration of below about 22 percent by weight of solution spends on limestone or dolomite to thus form calcium chloride and magnesium chloride and cools, some water and the gelling agent can separate out of the solution as a thick viscous phase. Separation does not occur when the initial hydrochloric acid concentration is about about 22 percent by weight. In order to prevent separation in spent solutions when acid concentrations below about 22 percent by weight are utilized, calcium chloride can be added to the aqueous hydrochloric acid solution prior to gelling in an amount such that after reaction, the spent solution contains a calcium chloride concentration equivalent to a spent 22 percent by weight hydrochloric acid solution. The amount of calcium chloride required generally falls within the range of from about 1 percent to about 10 percent by weight of the spent solution. That is, when a gelled and foamed aqueous hydrochloric acid solution having an acid concentration of above about 22 percent by weight of the solution is utilized in the treatment of subterranean well formations containing calcium, no calcium chloride is added to the live solution. When a gelled and foamed aqueous hydrochloric acid solution at a concentration of 20 percent by weight of solution is utilized, about 308 pounds of calcium chloride per 1000 gallons of aqueous acid solutions are added thereto which prevents separation at low temperatures (150° F. and below). When a gelled and foamed aqueous hydrochloric acid solution having a concentration of 15 percent by weight is utilized, about 1040 pounds of calcium chloride per 1000 gallons of acid solution are combined therewith to prevent such separation.

The following examples are given in order to further illustrate the gelled and foamed aqueous acid solutions of the present invention.

EXAMPLE 1

Gelling-foaming agents are prepared using various mixtures of ethoxylated fatty amines dissolved in glacial acetic acid. The gelling-foaming agents are added to aqueous acid solutions containing 15 percent by weight hydrochloric acid, and the viscosities of the resultant gels determined. The viscosities of the gels are apparent viscosities measured on a Model 35 FANN viscosmeter, no. 1 spring, standard bob and sleeve, at room temperature (72°–76° F.) and at 300 rpm. The results of these tests are given in Table I below.

of ethylene oxide per mole of amine and containing hydrocarbon chain lengths of 14 to 18 carbon atoms significantly increase the viscosity of aqueous hydrochloric acid solutions.

EXAMPLE 2

A gelling-foaming agent is prepared by dissolving 3 grams of ethoxylated soya amines having an average of 2 moles of ethylene oxide per mole of amine in 6 mls. (about 7 grams) of glacial acetic acid. The approximate composition of a commercial mixture of fatty acids from which the soya amine is derived is as follows:

| Acid | % By Weight |
|---|---|
| myristic ($C_{14}$) | 0 to 1% |
| palmitic ($C_{16}$) | 6 to 10% |
| stearic ($C_{18}$) | 2 to 4% |
| oleic ($C_{18}$) | 21 to 29% |
| linoleic ($C_{18}$) | 50 to 59% |
| linolenic ($C_{18}$) | 4 to 8% |

The agent is combined with 125 mls. (about 134 grams) of an aqueous hydrochloric acid solution containing 15 percent by weight hydrochloric acid. After mixing, the aqueous hydrochloric acid solution has an apparent viscosity of 95 centipoises measured on a Model 35 FANN viscometer, no. 1 spring, standard bob and sleeve at room temperature (72°–76° F.) and 300 rpm.

TABLE I
VISCOSITIES OF GELLED AQUEOUS HYDROCHLORIC ACID SOLUTIONS USING VARIOUS GELLING AGENTS

| Ethoxylated Fatty Amine Fatty Acid Origin | Average Moles of Ethylene Oxide Per Mole of Amine | Concentration of Amines Contained in Gelling Agent, % by Weight of Acetic Acid-Amine Solution | Concentration of Gelling Agent in Hydrochloric Acid Solution, % by Weight | Viscosity of Gelled Aqueous HCl Solution, cp |
|---|---|---|---|---|
| Coconut (Mixture of Chains Having 8, 10, 12, 14, 16 and 18 Carbon Atoms) | 2 | 33.3 | 9 | 3 |
| Coconut (Mixture of Chains Having 8, 10, 12, 14, 16 and 18 Carbon Atoms) | 5 | 33.3 | 9 | 3 |
| Soya (Mixture of Chains Having 14, 16 and 18 Carbon Atoms) | 2 | 33.3 | 9 | 77 |
| Soya (Mixture of Chains Having 14, 16 and 18 Carbon Atoms) | 5 | 33.3 | 9 | 3 |
| Tallow (Mixture of Chains Having 14, 16 and 18 Carbon Atoms) | 2 | 33.3 | 9 | 55 |
| Oleyl (18 Carbon Atoms) | 2 | 33.3 | 9 | 82 |
| Palmityl (16 Carbon Atoms) | 2 | 50 | 6 | 52 |

From Table I it can be seen that agents containing ethoxylated fatty amines derived from coconut, soya, tallow, oleic, and palmitic fatty acids increase the viscosity of aqueous hydrochloric acid solutions.

The results provided in Table I also make it clear that ethoxylated fatty amines having an average of 2 moles

EXAMPLE 3

Gelling-foaming agents are prepared by dissolving 5 grams of ethoxylated tallow amines having an average ethylene oxide content of 2 moles per mole of amine with various organic solvents. The agents are then each added in amounts of 10 mls. to 200 mls. of an aqueous acid solution prepared by combining 126.8 mls. of tap water with 73.2 mls. of a hydrochloric acid solution containing 37.5 percent by weight hydrochloric acid to thus produce 200 mls. of 15 percent HCl solution which weighs 215 grams. The solution also contains 25 grams of calcium chloride and 0.4 ml. of a hydrochloric acid corrosion inhibitor. After mixing the agents with the acid solutions, the apparent viscosities of the resulting gelled aqueous hydrochloric acid solutions are determined using a Model 35 FANN viscometer, no. 1 spring, standard bob and sleeve at 80° F. and 300 rpm. The results of these tests are shown in Table II below.

TABLE II
VISCOSITIES OF GELLED AQUEOUS HYDROCHLORIC ACID SOLUTIONS USING GELLING AGENTS CONTAINING VARIOUS ORGANIC ACIDS

| Quantity of Ethoxylated Tallow Amines, ml (grams) | Organic Solvent | Quantity of Organic Solvent, ml (grams) | Degree of Difficulty in Dissolving Amines in Solvent Used | Viscosity of Gelled Aqueous Hydrochloric Acid Solutions |
|---|---|---|---|---|
| 5 (5) | Propionic Acid | 5 (5.0) | Easily | 51 |
| 5 (5) | Acetic Acid | 5 (5.2) | Very Easily Dissolved | 70 |
| 5 (5) | Formic Acid - 88% | 5 (5.9) | Difficult | 88 |
| 5 (5) | Acetone | 5 (3.9) | Easily Dissolved | 67 |
| 5 (5) | Ethylene Glycol | 5 (5.5) | Easily Dissolved | 75 |

EXAMPLE 4

Gelling-foaming agents are prepared by dissolving ethoxylated tallow amines having an average of 2 moles of ethylene oxide per mole of amine in various organic acids in amounts of 50 percent by weight of amine-acid solution. Each of the agents is combined with aqueous hydrochloric acid solutions in amounts of 5 percent agent by weight of the acid solutions, and the viscosities of the resulting gelled aqueous acid solutions are determined at various temperatures. Each of the aqueous acid solutions contains 15 percent hydrochloric acid by weight, 12.5 grams of calcium chloride per 100 cc of acid solution, and 0.2 percent by weight of a hydrochloric acid corrosion inhibitor.

TABLE III
VISCOSITIES OF GELLED HYDROCHLORIC ACID SOLUTIONS AT VARIOUS TEMPERATURES USING GELLING AGENTS CONTAINING VARIOUS ORGANIC ACIDS

| Organic Acid | Viscosities of Gelled Aqueous HCl Solutions, cp | | | | | | | | | |
|---|---|---|---|---|---|---|---|---|---|---|
| | 90° F. | 100° F. | 110° F. | 120° F. | 130° F. | 140° F. | 150° F. | 160° F. | 170° F. | 180° F. |
| Formic | 70 | 66 | 61 | 55 | 48.5 | 40 | 30 | 23.5 | 19 | 16 |
| Acetic | 67 | 61 | 54 | 46 | 35 | 29 | 23 | 19 | 14.5 | 10.5 |
| Propionic | 41.5 | 30 | 21.5 | 16 | 13 | 10.5 | 8 | 6 | 4.5 | 3.5 |

As illustrated in Tables II and III above, gelling agents wherein formic acid is used as the amine solvent achieve the highest apparent viscosity in hydrochloric acid solutions. However, because the dissolution of ethoxylated fatty amines in formic acid is difficult, acetic acid is preferred for use in accordance with this invention.

EXAMPLE 5

A gelling-foaming agent is prepared by dissolving ethoxylated tallow amines having an average ethylene oxide content of 2 moles per mole of amine in acetic acid in an amount of 50 percent by weight of the amine-acid solution. Various amounts of the gelling agent are combined with aqueous hydrochloric acid solutions containing 15 percent by weight hydrochloric acid and 0.4 percent by weight hydrochloric acid corrosion inhibitor. The apparent viscosities of the resulting gelled aqueous hydrochloric acid solutions are determined at various temperatures using a Model 35 FANN viscometer, no. 1 spring, standard bob and sleeve at 300 rpm. The results of these tests are given in Table IV below.

TABLE IV
VISCOSITIES OF GELLED AQUEOUS HYDROCHLORIC ACID SOLUTIONS AT VARIOUS TEMPERATURES USING VARIOUS QUANTITIES OF GELLING AGENT

| Percent Gelling Agent by Weight of Acid Solution | Viscosities of Gelled Aqueous HCl Solutions, cp | | | | | | | |
|---|---|---|---|---|---|---|---|---|
| | 90° F. | 100° F. | 110° F. | 120° F. | 130° F. | 140° F. | 150° F. | 160° F. |
| 2 | 19 | 8.5 | 4 | 3 | 2.5 | — | — | — |
| 3 | 37.5 | 35 | 31.5 | 27 | 21 | 15.5 | 6 | 2.5 |
| 4 | 48.5 | 45 | 40 | 31.5 | 24 | 18 | 14 | 10 |
| 5 | 68.5 | 65 | 50 | 38 | 31 | 24 | 19 | 14 |

From Table IV it can be seen that by increasing the amount of gelling-foaming agent combined with an aqueous solution, the viscosity of the resultant gelled solution is increased.

EXAMPLE 6

A gelling-foaming agent is prepared by dissolving ethoxylated tallow amines having an ethylene oxide content of 2 moles per mole of amine in glacial acetic acid in an amount of 50 percent by weight of the resulting solution. A portion of the agent is combined with an aqueous hydrochloric acid solution in an amount of 5 percent by weight of the acid solution. The acid solution contains 15 percent by weight of hydrochloric acid, 12.5 grams of calcium chloride per 100 cc of the solution and 0.2 percent by weight of a hydrochloric acid corrosion inhibitor. The resulting gelled aqueous hydrochloric acid solution is spent to 10.3 percent by weight live hydrochloric acid by reacting the solution with limestone. Viscosities of the spent solution are determined at various temperatures using a Model 35 FANN viscometer, no. 1 spring, standard bob and sleeve at 300 rpm. The results of these tests are given in Table V.

TABLE V
VISCOSITES OF GELLED 15% BY WEIGHT AQUEOUS HYDROCHLORIC ACID SOLUTION AT VARIOUS TEMPERATURES AFTER BEING SPENT TO 10.3% BY WEIGHT LIVE ACID

| Temperature, °F. | Viscosity, cp |
|---|---|
| 84 | 70 |
| 90 | 45 |
| 100 | 7 |
| 110 | 5 |
| 120 | 3.5 |
| 130 | 2 |

From Table V it can be seen that when a gelled 15 percent by weight hydrochloric acid solution is spent to a live acid concentration of 10.3 percent by weight, the acid solution is broken to a viscosity of less than about 10 cp at a temperature of 100° F.

EXAMPLE 7

A gelling-foaming agent is prepared as described in Example 6 and is combined with an aqueous hydrochloric acid solution in an amount of 5 percent by weight of acid solution. The hydrochloric acid solution contains 28 percent by weight hydrochloric acid and 0.5 percent by weight acid corrosion inhibitor. The resulting gelled aqueous hydrochloric acid solution is spent by reaction with limestone to various live acid concentrations, and the viscosities of such partially spent solutions are determined at various temperatures using a Model 35 FANN viscometer, no. 1 spring, standard bob and sleeve at 300 rpm. The results of these tests are shown in Table VI below.

TABLE VI
VISCOSITIES OF GELLED 28% BY WEIGHT AQUEOUS HYDROCHLORIC ACID SOLUTIONS AT VARIOUS TEMPERATURES AFTER BEING SPENT TO VARIOUS LIVE ACID CONCENTRATIONS

| Spent Solution Live Acid Concentration, % By Weight | Viscosities of Spent Acid Solutions, cp | | | | | | | |
|---|---|---|---|---|---|---|---|---|
| | 90° F. | 100° F. | 110° F. | 120° F. | 130° F. | 140° F. | 150° F. | 160° F. |
| 19.9 | 19.5 | 20 | 20 | 19 | 18 | 16.5 | 1 | 13 |
| 15.9 | 70 | 66.5 | 60 | 51 | 40 | 30 | 5 | 3 |
| 10.3 | 45 | 8.5 | 6 | 5 | 4 | 3 | 2 | 1.5 |
| 6.2 | 6 | — | — | — | — | — | — | — |

From Table VI it can be seen that when a gelled aqueous hydrochloric acid solution containing 28 percent by weight hydrochloric acid is spent to a live acid concentration below about 16 percent by weight, such spent solution is broken to a viscosity below about 5 cp at 150° F.

EXAMPLE 8

A gelling-foaming agent is prepared by dissolving ethoxylated tallow amines having an ethylene oxide content of 2 moles per mole of amine in glacial acetic acid in an amount of 50 percent by weight of the solution. Portions of the agent are added to aqueous hydrochloric acid solutions, and the resulting gelled hydrochloric acid solutions are spent by reaction with limestone. The apparent viscosities of the spent solutions are measured on a Model 35 FANN visometer, no. 1 spring, standard bob and sleeve at 300 rpm. The particle or fines suspending properties of the spent acid solutions are determined by placing 2 grams of fines in 100 ml portions of the spent solutions, mixing the solutions and then allowing the fines to settle in the solutions for 6 hours. The fines remaining suspended in the solutions after the 6-hour periods are determined by collecting the fines by centrifugation, washing, drying and weighing. The results of these tests are given in Table VII below.

TABLE VII
FINE SUSPENSION ABILITY OF SPENT GELLED AQUEOUS ACID SOLUTIONS

| Gelled Aqueous Acid Solution | | | | Solution Live Acid | | Suspended |
|---|---|---|---|---|---|---|
| HCl, By Weight | Calcium Chloride, Grams/ 100 cc Acid Solution | Acid Corrosion Inhibitor, % By Weight | Gelling Agent % By Weight | Concentration After Spending, % HCl By Weight | Viscosity of Spent Acid After Solution, cp | Fines in Spent Acid Solution After 6 Hours, mg/ 100 cc |
| 15 | 12.5 | 0.2 | 5 | 1.5 | 10 (74° F.) | 206 |
| 20 | 3.7 | 0.2 | 5 | 1.2 | 5 (80° F.) | 279 |
| 28 | 0 | 0.2 | 5 | 1.4 | 7.5 (64° F.) | 330 |
| Deionized water only | | | | | | 5 |

From Table VI it can be seen that the spent gelled aqueous acid solutions have excellent fines suspension capability.

EXAMPLE 9

A gelling-foaming agent is prepared by dissolving ethoxylated tallow amines having an ethylene oxide content of 2 moles per mole of amine in glacial acetic acid in an amount of 50% by weight of the solution. Various portions of the agent are added to aqueous 15% by weight hydrochloric acid solutions, and the resulting gelled hydrochloric acid solutions of various viscosities are foamed in a foam generator.

Foam may be generated by a variety of methods. Any type of mixing chamber is sufficient which allows air or nitrogen to be mixed thoroughly with the aqueous acid solution to be foamed. Finely divided air which produces very small bubbles in the foam is required. This breaking up of the air into small bubbles can be accomplished using small orifices, mechanical agitators, screens, or porous glass frits. An orifice with an air injection system is used for these tests.

The quality of a foam is determined by the following relationship:

$$Quality = \frac{gas\ volume\ in\ foam}{total\ foam\ volume} \times 100$$

Foams are produced using ratios of gas and liquid such that qualities of 60-90 are obtained.

The static stability of produced foam is measured by collecting foam in a 500 cc cylinder and recording the time for liquid to drain from the foam. A plot of % of liquid separated versus time in seconds is made, the slope of which is the drainage rate. The half life of the foam ($t_{\frac{1}{2}}$) is then determined by the following relationship:

$$t_{\frac{1}{2}} = \frac{50}{drainage\ rate}$$

Viscosities of the gelled hydrochloric acid solutions are determined using a Model 35 FANN viscometer No. 1 spring, standard bob and sleeve at 300 rpm and at room temperature (72°-76° F.).

The results of these tests are given in Table VIII below.

TABLE VIII

FOAM STABILITY OF GELLED AND FOAMED 15% BY WEIGHT AQUEOUS HYDROCHLORIC ACID SOLUTIONS

| Vol. % Gelling-Foaming Agent in Aqueous HCl | Viscosity of Gelled Acid, cp | Quality of Foamed-Gelled Acid | Foam Stability ($t_{\frac{1}{2}}$) Foamed-Gelled Acid, Minutes |
|---|---|---|---|
| 0 | 1 | 0 | 0 |
| 0.5 | 2 | 77 | 8.0 |
| 1.0 | 5 | 81 | 27.0 |
| 1.5 | 10 | 78 | 36.2 |
| 2.0 | 17 | 77 | 44.4 |
| 2.5 | 24 | 76 | 75.5 |
| 3.0 | 26 | 71 | 132.0 |
| 1.0[1] | 1 | 75 | 4.5 |

[1] A nonionic surfactant foaming agent for acid which imparts no gel character to the acid was used in this test for comparison purposes.

From Table VIII it can be seen that the foam stabilities of the gelled and foamed aqueous acid solutions of this invention increase with increasing viscosity and that excellent foam stabilities are obtained.

What is claimed is:

1. A foamed and gelled aqueous inorganic acid solution consisting of:
   (a) an inorganic acid;
   (b) water;
   (c) an inert gas; and,
   (d) a gelling-foaming agent, said gelling-foaming agent consisting of a water soluble organic solvent; and
   a mixture of ethoxylated fatty amines having the general formula:

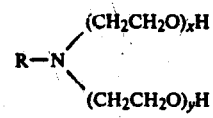

wherein: R is selected from saturated and unsaturated aliphatic groups having in the range of from about 8 to about 22 carbon atoms and mixtures thereof; the average sum of the value of x and y in said mixture is in the range of from about 1.8 to 2.2 and said ethoxylated fatty amine is present in said gelling agent in the range of from about 10.0% to about 80.0% by weight of said gelling agent.

2. The solution of claim 1 wherein said organic solvent is selected from the group consisting of methanol, ethanol, formic acid and isopropanol.

3. The solution of claim 1 wherein said organic solvent is acetic acid.

4. The solution of claim 1 wherein said organic solvent is acetone, methylethyl ketone, acetone, ethylene glycol and glycerine.

5. The solution of claim 1 wherein said inert gas is nitrogen.

6. The solution of claim 1 wherein R is selected from the group consisting of saturated and unsaturated aliphatic groups having in the range of from about 16 to about 18 carbon atoms and mixtures thereof.

7. A method of acid treating a subterranean formation comprising:
   introducing into said formation a foamed and gelled aqueous inorganic acid solution consisting of an inorganic acid;
   water;
   an inert gas;
   a gelling-foaming agent, said gelling-foaming agent consisting of
   a water soluble organic solvent; and
   a mixture of ethoxylated fatty amines having the general formula

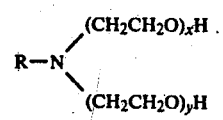

wherein; R is selected from saturated and unsaturated aliphatic groups having the range of from about 8 to about 22 carbon atoms and mixtures thereof; the average sum of the value of x and y in said mixture is in the range of from about 1.8 to 2.2; and said ethoxylated fatty amine is present in said gelling-foaming agent in the range of from about 10.0% to about 80.0% by weight of said gelling agent.

8. The method of claim 7 wherein said organic solvent is selected from the group consisting of methanol, ethanol and isopropanol.

9. The method of claim 7 wherein said organic solvent is acetic acid.

10. The method of claim 7 wherein said organic solvent is acetone, methylethyl ketone, acetone, ethylene glycol and glycerine.

11. The method of claim 7 wherein said inert gas is nitrogen.

12. The method of claim 7 wherein R is selected from the group consisting of saturated and unsaturated aliphatic groups having in the range of from about 16 to 18 carbon atoms and mixtures thereof.

* * * * *

UNITED STATES PATENT AND TRADEMARK OFFICE
CERTIFICATE OF CORRECTION

PATENT NO. : 4,324,669

DATED : April 13, 1982

INVENTOR(S) : Lewis R. Norman et al.

It is certified that error appears in the above-identified patent and that said Letters Patent is hereby corrected as shown below:

Column 3, at line 10, the word "density" should read --desirably--.

In Table VI, the entry for "19.9" reads:

TABLE VI

VISCOSITIES OF GELLED 28% BY WEIGHT AQUEOUS HYDROCHLORIC ACID SOLUTIONS AT VARIOUS TEMPERATURES AFTER BEING SPENT TO VARIOUS LIVE ACID CONCENTRATIONS

| Spent Solution Live Acid Concentration, % By Weight | Viscosities of Spent Acid Solutions, cp | | | | | | | |
|---|---|---|---|---|---|---|---|---|
| | 90°F | 100°F | 110°F | 120°F | 130°F | 140°F | 150°F | 160°F |
| 19.9 | 19.5 | 20 | 20 | 19 | 18 | 16.5 | 1 | 13 | it should read:

UNITED STATES PATENT AND TRADEMARK OFFICE
CERTIFICATE OF CORRECTION

PATENT NO. : 4,324,669

DATED : April 13, 1982

INVENTOR(S) : Lewis R. Norman et al.

It is certified that error appears in the above-identified patent and that said Letters Patent is hereby corrected as shown below:

TABLE VI

VISCOSITIES OF GELLED 28% BY WEIGHT AQUEOUS HYDROCHLORIC ACID SOLUTIONS AT VARIOUS TEMPERATURES AFTER BEING SPENT TO VARIOUS LIVE ACID CONCENTRATIONS

| Spent Solution Live Acid Concentration, % By Weight | Viscosities of Spent Acid Solutions, cp | | | | | | | |
|---|---|---|---|---|---|---|---|---|
| | 90°F | 100°F | 110°F | 120°F | 130° | 140°F | 150°F | 160°F |
| 19.9 | 19.5 | 20 | 20 | 19 | 18 | 16.5 | 15 | 13 |

Signed and Sealed this

Thirtieth Day of November 1982

[SEAL]

Attest:

GERALD J. MOSSINGHOFF

Attesting Officer   Commissioner of Patents and Trademarks